United States Patent
Khosravi

(10) Patent No.: US 7,197,664 B2
(45) Date of Patent: Mar. 27, 2007

(54) STATELESS REDUNDANCY IN A NETWORK DEVICE

(75) Inventor: Hormuzd M. Khosravi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 10/282,457

(22) Filed: Oct. 28, 2002

(65) Prior Publication Data
US 2004/0083403 A1   Apr. 29, 2004

(51) Int. Cl.
*G06F 11/00* (2006.01)
(52) U.S. Cl. .......................................... 714/12; 714/13
(58) Field of Classification Search .................. 714/12, 714/13, 11, 10, 5–7, 25, 2
See application file for complete search history.

(56) References Cited

U.S. PATENT DOCUMENTS

| | | | | |
|---|---|---|---|---|
| 5,005,174 A | * | 4/1991 | Bruckert et al. | 714/11 |
| 5,099,485 A | * | 3/1992 | Bruckert et al. | 714/11 |
| 5,136,498 A | * | 8/1992 | McLaughlin et al. | 700/79 |
| 5,202,822 A | * | 4/1993 | McLaughlin et al. | 700/82 |
| 5,426,774 A | * | 6/1995 | Banerjee et al. | 714/16 |
| 5,572,663 A | * | 11/1996 | Hosaka | 714/12 |
| 6,205,565 B1 | * | 3/2001 | Bissett et al. | 714/49 |
| 6,751,191 B1 | * | 6/2004 | Kanekar et al. | 370/217 |
| 6,868,509 B2 | * | 3/2005 | Gale et al. | 714/43 |

* cited by examiner

*Primary Examiner*—Dieu-Minh Le
(74) *Attorney, Agent, or Firm*—Kacvinsky LLC

(57) ABSTRACT

A network device may be configured with a primary control element and a second control element. Both the primary and secondary control elements may receive information from one or more forwarding elements. Both the primary and secondary control elements may send control information to the forwarding element. The control information from the secondary control element, however, may be discarded either at the forwarding element or at a blocking agent between the secondary control element and the forwarding element. In this manner, the secondary control element may be synchronized with the primary control element in a stateless manner. If a failure condition is detected, control plane operations may be performed using the secondary control element. As a result, the network device may become fault tolerant, and experience reduced amounts of down time due to failure of one or more elements within the network device.

15 Claims, 2 Drawing Sheets

STATELESS REDUNDANCY IN A NETWORK DEVICE

BACKGROUND

Fault tolerance technology is directed to making a system resistant to failure. A common technique to implement fault tolerance is to provide redundancy for critical elements in a device or network. For example, if a communications link between network nodes fails then backup links may be available to carry re-routed traffic around the failed link. In this manner, operations may continue with reduced interruptions. This may also be true for elements within a network device, such as a router or switch. There are a number of critical elements that may merit having backup elements to provide redundancy in the case of failure. Some network devices, however, may be so complex as to require special techniques to manage fail-over to redundant elements. Consequently, there may be need for improvements in such techniques to improve fault tolerance in a device or network.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
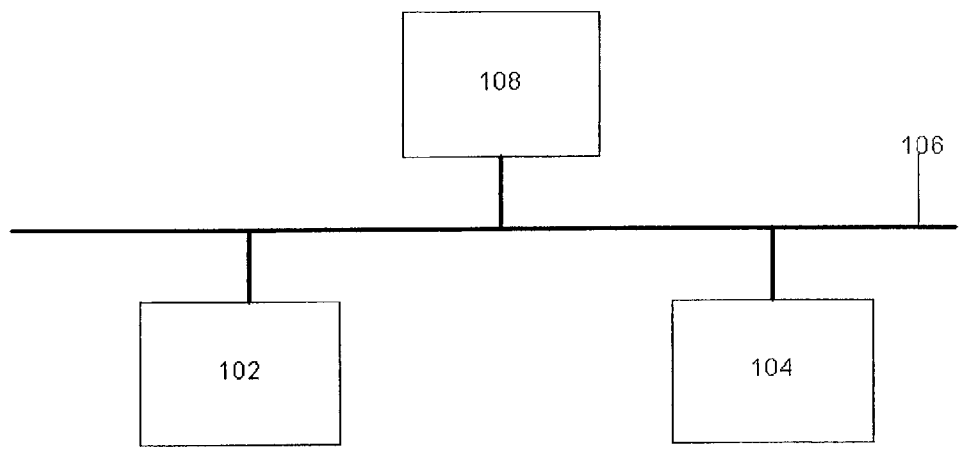
FIG. 1 is a system suitable for practicing one embodiment of the invention.

Network devices such as switches and routers may be generally classified as distributed systems having three logical components, namely the control plane, the forwarding plane, and the management plane. In the interest of preserving the behavior of a network device, it may be desirable to implement fault tolerant techniques in designing one or more of the various planes. One way to provide fault tolerance for such a distributed architecture is to use redundancy of the components. For example, a network device such as a router or switch may have control elements and forwarding elements. It may be desirable for a network device to have redundant control elements and forwarding elements, as well as a mechanism to manage a quick fail over between the components, in order to provide fault tolerance. More particularly, the fail over mechanism should address two issues. First, there should be a mechanism to quickly detect failure of the primary component and switch to the secondary component. Second, there should be a mechanism to synchronize state information between redundant components before the fail over occurs.

Embodiments of the invention may comprise a method and apparatus to provide fault tolerance for a network device, such as a router or switch. In one embodiment of the invention, a network device may be configured with a primary control element and a second control element. Both the primary and secondary control elements may receive information from one or more forwarding elements. Both the primary and secondary control elements may send control information to the forwarding element. The control information from the secondary control element, however, may be discarded either at the forwarding element or at a blocking agent between the secondary control element and the forwarding element. In this manner, the secondary control element may be synchronized with the primary control element in a stateless manner. A Fault Tolerant Management (FTM) module may monitor the primary control element to detect a failure condition. If the FTM module detects a failure condition, control plane operations may be performed using the secondary control element. As a result, the network device may become fault tolerant, and experience reduced amounts of down time due to failure of one or more elements within the network device.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media. A network node ("node") in this context may include any device capable of communicating information, such as a computer, server, switch, router, bridge, gateway, personal digital assistant, mobile device and so forth. A communications medium may include any medium capable of carrying information signals, such as twisted-pair wire, co-axial cable, fiber optics, radio frequencies, electronic, acoustic or optical signals, and so forth.

More particularly, system 100 may comprise a router 102, a router 104 and a router 108, all connected by a communications medium 106. Although FIG. 1 shows only 3 network nodes, it can be appreciated that any number of network nodes may be used in system 100 and still fall within the scope of the invention. Furthermore, the terms "connection" and "interconnection," and variations thereof, in this context may refer to physical connections and/or logical connections.

In one embodiment of the invention, system 100 may use packet forwarding to communicate information. Packet forwarding in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be a packet forwarding protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (TP) as defined by the IETF standard 5, RFC 791, adopted in September, 1981 ("IP Specification"), both available from "www.ietf.org" (collectively referred to as the "TCP/IP Specification"). Packets may be addressed using any number of protocols, such as the Internet Protocol Version Four (IPv4) addressing identified by the IP Specification, and the IETF Internet Protocol Version Six (IPv6) draft standard, RFC 2460, dated December 1998 ("IPv6 Specification"), also available from "www.ietf.org."

In one embodiment of the invention, routers 102, 104 and 108 may communicate information over communications medium 106. Information may comprise any data capable of being represented as a signal, such as an electrical signal, optical signal, acoustical signal and so forth. Examples of information in this context may include both data and control information.

Figure 2:
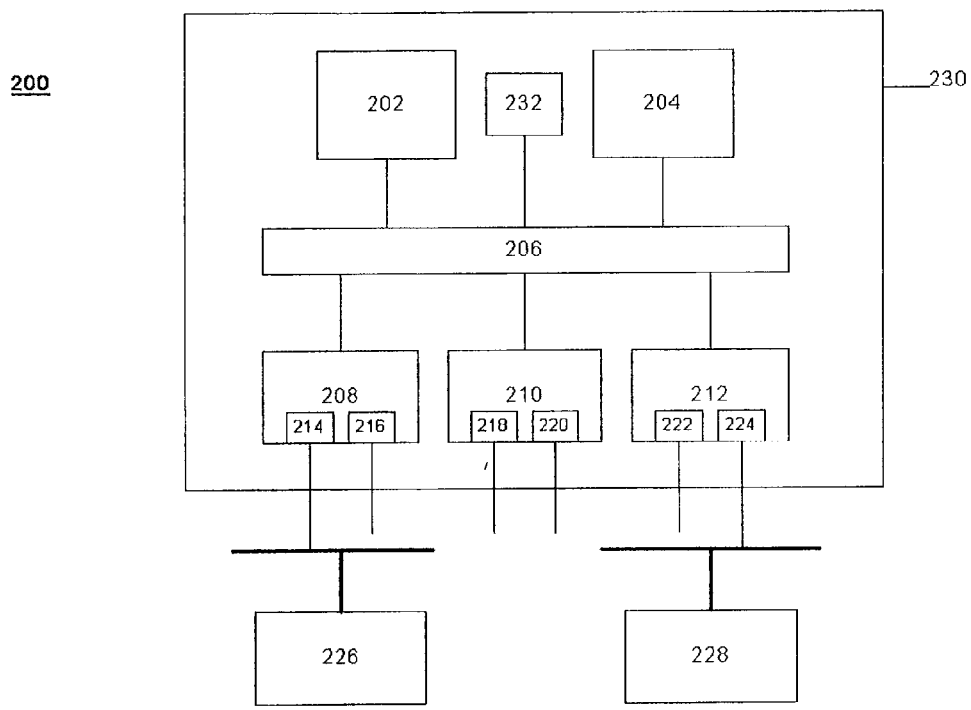
FIG. 2 is a block diagram of a network node in accordance with one embodiment of the invention.

FIG. 2 illustrates a block diagram of a network node in accordance with one embodiment of the invention. FIG. 2 may illustrate a system 200 having a router 226, a router 228 and a router 230. In one embodiment, router 230 may be representative of any network node that is shown as part of systems 100 and 200, respectively.

In general, router 230 may incorporate functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (eg, floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, router 230 may have architecture consistent with the Control Plane Platform Development Kit (CP-PDK) Software Architecture ("CP-PDK Specification") developed by Intel Corporation. The CP-PDK Specification describes a high-level architectural implementation of the Network Processor Forum (NPF) Application Level Application Program Interface (API) and Management Level API, as set forth in the NPF Software API Framework Implementation Agreement, Version 1, August 2002 ("NPF Specification").

In one embodiment of the invention, router 230 may comprise a forwarding element 208, a forwarding element 210 and a forwarding element 212. Forwarding element 208 may further comprise ports 214 and 216. Forwarding element 210 may further comprise ports 218 and 220. Forwarding element 212 may further comprise ports 222 and 224. Forwarding elements 208, 210 and 212 may communicate information to a control element 202 and a control element 204 via a backplane 206. Forwarding elements 208, 210 and 212 may also communicate information to routers 226 and 228, for example.

In one embodiment of the invention, control elements 202 and 204 may each include a processor and software. Control elements 202 and 204 collectively may comprise a control plane for router 230. The control plane may control and configure the forwarding plane, which actually manipulates the network traffic. In general, the control plane executes different signaling or routing protocols and provides control information to the forwarding plane. For example, the control plane in router 230 may execute routing protocols like the Border Gateway Protocol (BGP) or Open Shortest Path First (OSPF).

In one embodiment of the invention, forwarding elements 208, 210 and 212 may each comprise a processor and software. Forwarding elements 208, 210 and 212 may collectively comprise a forwarding plane for router 230 and, in general, may perform hardware-based switching. The forwarding plane makes decisions based on control information received from the control plane, and performs operations on packets like forwarding, classification, filtering and so forth. The forwarding plane may be responsible for the "fast path" forwarding of data via backplane 206 and ports 214–224.

In general, router 230 may also include a management plane (not shown). The management plane is typically orthogonal and manages the control and forwarding planes. It provides logging and diagnostic capabilities, non-automated configuration like operator intervention, and can activate or deactivate various control and forwarding plane modules. For example, the management plane may start or stop routing processes, or may perform logging.

In one embodiment of the invention, backplane 206 may be a meshed cross-connect switch to transport information between any of the control elements and forwarding elements. The control plane and the forwarding plane may communicate information via back plane 206 in accordance with one or more protocols. For example, in one embodiment of the invention, the control elements and forwarding elements may communicate information in accordance with the Forwarding And Control Element Separation (ForCES) protocol data model, such as defined by the IETF ForCES Working Group ForCES FE Functional Model Draft, dated June 2002 ("ForCES Protocol"), and the Common Open Policy Service (COPS) protocol, as defined by the IETF RFC 2748, dated January 2000 ("COPS Specification"), although the embodiments are not limited in this context.

In one embodiment of the invention, router 230 may also comprise a Fault Tolerant Management (FTM) module 232. FTM 232 may manage fault tolerant operations for the control plane in accordance with the principles described herein. For example, FTM 232 may manage the synchronization of information between primary and secondary control elements. FTM 232 may also monitor the primary control element for a fault condition, and manage fail-over from the primary to secondary control elements in the event of failure of the primary control element. Although FTM 232 may be shown as part of the control plane for router 230, it can be appreciated that FTM 232 may also be implemented in the forwarding plane or the management plane, or be distributed among two or more planes.

The operations of systems 100 and 200 may be further described with reference to FIG. 3 and accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
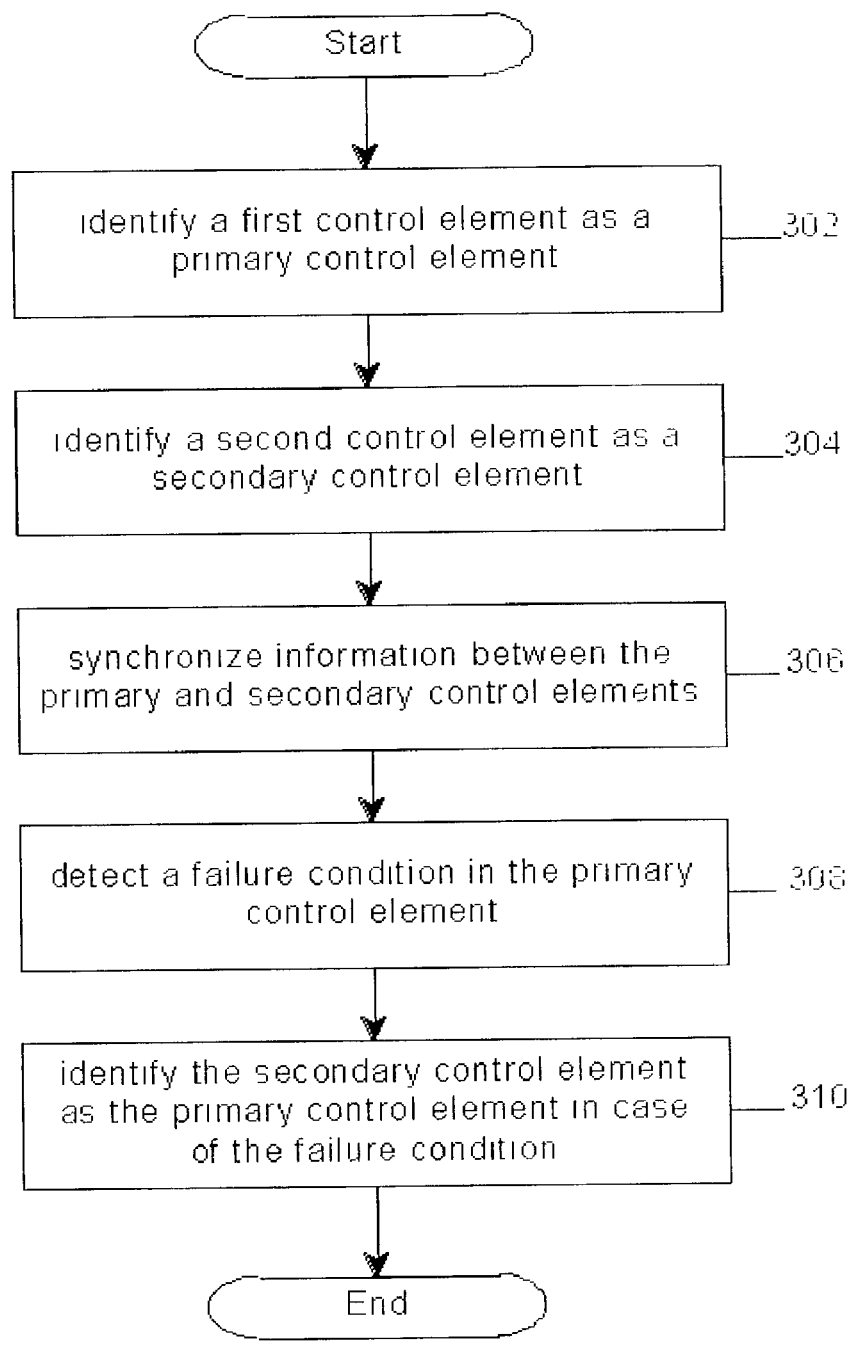
FIG. 3 is a block flow diagram of operations performed by a Fault Tolerant Management (FTM) module in accordance with one embodiment of the invention.

FIG. 3 is a block flow diagram of the operations performed by a FTM module in accordance with one embodiment of the invention. In one embodiment of the invention, this and other modules may refer to the software and/or hardware used to implement the functionality for one or more embodiments as described herein. In this embodiment of the invention, these modules may be implemented as part of a processing system, such as a processing system associated with the control plane or forwarding plane. It can be appreciated that this functionality, however, may be implemented by any element, or combination of elements, located anywhere in router 230 and still fall within the scope of the invention.

FIG. 3 illustrates a programming logic 300 for a FTM module in accordance with one embodiment of the invention. In one embodiment of the invention, programming logic 300 may describe programming logic to provide fault tolerance for a network device, such as a router or switch. A first control element may be identified or designated as a primary control element at block 302. A second control element may be identified or designated as a secondary control element at block 304. Information from a forwarding element may be synchronized between the primary and secondary control elements at block 306. Examples of information may include information from data packets and control packets, as well as forwarding element state information, capabilities information, port up/down events, and so forth. A failure condition in the primary control element may be detected at block 308. The secondary control element may be identified or designated as the primary control element in case at block 310 if a failure condition is detected at block 308.

In one embodiment of the invention, information from the forwarding element may be synchronized as follows. Each forwarding element may send information to both control elements. The primary and secondary control elements will therefore have the same set of information at any operational point, not taking into account any latencies in the respective paths between the forwarding element and the control elements. Both the primary and secondary control elements will process the information and provide control information to the forwarding element in a conventional manner. Control information from the secondary control element, however, may be discarded by the forwarding element. Alternatively, a blocking agent may intercept the control information from the secondary element and discard the control information before it reaches the forwarding element.

In one embodiment of the invention, the detection may be accomplished using the "heartbeat" mechanism in accordance with the COPS Specification. Status messages may be communicated between the forwarding element and the primary control element on a periodic basis. An example of a status message may be a COPS "keep-alive" message. A determination may be made as to whether each status message is received within a predetermined interval. If a status message is not received within a predetermined interval, a failure condition may have been detected.

The operation of systems 100 and 200, and the processing logic shown in FIG. 3, may be better understood by way of example. FTM 232 may provide fault tolerant management for router 230. FTM 232 may have two primary responsibilities. First, FTM 232 must monitor and detect failure of the primary control element. Second, FTM 232 must maintain state synchronization between the primary and secondary control elements.

In order for the forwarding elements to fail-over from the primary control element to the secondary control element, they need to quickly detect failure in the primary control element. A heartbeat mechanism between the forwarding elements and control elements could be used to detect when the communication with a control element breaks for some reason. For example, the ForCES Protocol, which may be built over the COPS protocol, provides this mechanism in the CP-PDK architecture. The CP-PDK architecture uses the COPS Keep-Alive messages between the forwarding elements and control elements to detect failure of communication of the forwarding elements with the primary control element.

In order to provide fast fail-over between redundant control elements their state information should be synchronized before the failure occurs. The state information in control elements includes the CP-PDK state as well as the state of the protocol stacks running on the control elements. In the current mechanism, the forwarding elements may bind to both the primary as well as the secondary control elements. Both the control elements may run identical software both in terms of CP-PDK as well as the routing stacks. The forwarding elements may send their capabilities as well as other state information such as port up/down events to both the control elements using, for example, the ForCES Protocol. In addition, the control packets such as Routing Information Protocol (RIP) and OSPF messages may also be redirected to both the control elements. Thus the state of both the redundant control elements may be synchronized Any configuration information, which is directed from the user or applications to the control elements, are synchronized by using identical configuration files or configuring the application to communicate with both control elements.

More particularly, when a router with CP-PDK architecture is booted, both the primary and secondary control elements may be started along with all the forwarding elements connected to the Control elements. Both the control elements may run similar software both in terms of CP-PDK as well as the routing stacks. The forwarding elements may bind with both control elements using the ForCES Protocol, and start exchanging state information such as their capabilities, interface control element properties and so forth with the control elements. In addition, routing updates (RIP, OSPF messages) and other relevant protocol control packets may be redirected from the forwarding elements to both the control elements. Any user-configured state information such as interface control element addresses may also need to be synchronized between the control elements. This may be accomplished by using the same configuration files on both control elements, at least in the case of static configuration. For dynamic configurations, which may be remotely done using protocols such as the Simple Network Management Protocol (SNMP), the configuration/management application may be configured so that it communicates the same configuration information with both control elements. Thus the state of the protocol stacks as well as the CP-PDK on both the control elements may be synchronized.

In one example, the ForCES Protocol may be built over the COPS protocol, which may also provide a heartbeat mechanism (e.g., using COPS keep-alive messages) to detect failure in communication between the forwarding elements and control elements. The interval of the periodic COPS keep-alive messages can be configured to detect any failure conditions. During normal operation the forwarding elements receive control commands from both control elements. The forwarding elements, however, process the control commands from only the primary control element. The commands sent by the secondary control element are considered as "No-Ops" and may be ignored by the forwarding elements. When the forwarding elements detect a failure in the primary control element (e.g., triggered by interruption in heartbeat), they may switch to the secondary control element. This means that the forwarding elements start processing commands by the secondary control element, instead of ignoring them, thus treating it like the primary control element. At this point, the secondary control element can take immediate control of the forwarding elements since the relevant state information is already present in the control element. Thus the fail-over may be relatively fast, depending on the keep-alive interval set for a particular implementation, since the state information may be synchronized prior to the failure.

One optimization, which can be made to this mechanism in order to reduce the number of ForCES Protocol messages, is to have a fail-over agent on the control elements. This fail-over agent could be part of the ForCES Protocol stack and its functionality would be to drop control command messages sent by the secondary control element to the forwarding elements. It would do this until there was some failure in the system and the secondary control element is notified that it has become the primary control element for the forwarding elements.

It is worthy to note that the COPS protocol on which the ForCES Protocol is built may also provide a fail-over mechanism. This mechanism, however, should not be used for the CP-PDK architecture since it is a state based mechanism and may require the forwarding element to maintain state. In the case of the CP-PDK architecture, this would mean that the forwarding element may need to keep state for all the periodic routing updates and other control protocol packets until failure occurs, and then send them to the secondary control element for state synchronization. This would likely lead, however, to a state explosion on the forwarding element.

One of the advantages of the embodiments may be that they may not require the forwarding elements to maintain any state in order to support fail-over between redundant control elements. Another advantage may be that this is a mechanism that may not require any direct communication protocol between redundant control elements. It may use the ForCES Protocol for communication between the control elements and forwarding elements. The fail-over mechanism described may also be faster than conventional solutions since the control element state information may be synchronized prior to fail over.

Referring again to FIG. 2, there is illustrated a fault-tolerant router architecture based on the CP-PDK architecture. Router 230 may be, for example, based on the CP-PDK architecture and consists of three forwarding elements and two control elements. Router 230 may be exchanging protocol packets (e.g., RIP, OSPF) with routers 226 and 228 through ports 214 and 224, respectively. The protocol packets as well as other forwarding element state information are sent to both the control elements from the forwarding elements. The control commands may also be sent from the both the control elements to all the forwarding elements.

A pseudo-code representation of the fail-over mechanism as implemented on the forwarding elements may be illustrated as follows:

```
DuringNormalOperation {
    start_Heartbeat_Thread( );
    send_FE_state(CE_{pI1}, CE_{sec});
    send_FE_events(CE_{pr1}, CE_{sec});
    send_Control_packets(CE_{pr1}, CE_{sec});
    onReceive_CEcommand( ) {
        if (CE_{pr1})
            process cmd;
        }else if (CE_{sec}){
            return;
        }
    }
}
onFailure {
    /*process control cmds from secondary CE*/
    CE_{sec} = CE_{pri};
    send_Notification(CE_{sec});
    continue NormalOperation;
}
```

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to provide fault tolerance, comprising:
   identifying a first control element as a primary control element;
   identifying a second control element as a secondary control element;
   synchronizing information between said primary and secondary control elements, wherein said synchronizing comprises receiving said information from a forwarding element at both said primary and secondary control elements, wherein said information comprises data packets and forwarding element state information;
   detecting a failure condition in said primary control element; and
   identifying said secondary element as said primary control element in case of said failure condition;
   wherein said detecting comprises communicating status messages between said forwarding element and said primary control element on a periodic basis, determining whether each status message is received within a predetermined interval, and identifying said failure condition in accordance with said determination.

2. The method of claim 1, further comprising: receiving control information from said primary and secondary control elements at said forwarding element; and
   discarding said control information from said secondary control element.

3. The method of claim 1, further comprising:
   receiving control information from said secondary control element at a blocking agent; and
   discarding said control information from said secondary control element.

4. The method of claim 1, wherein said status messages are communicated in accordance with a Common Open Policy Service (COPS) Specification.

5. The method of claim 1, wherein said information is received in accordance with a Forwarding And Control Element Separation (ForCES) protocol.

6. An apparatus, comprising:
a plurality of forwarding elements;
a primary control element;
a secondary control element;
a backplane connected to said forwarding elements, said primary control element and said secondary control element, to communicate information between said elements; and
a fault tolerant management (FTM) module to synchronize information between said primary control element and said secondary control element, and to identify said secondary control element as said primary control element if said primary control element fails;
wherein said synchronized information comprises data packets and forwarding element state information; and.
wherein said FTM module further comprises a fault detection (FD) module to detect a failure condition for said primary control element, said detection comprising communicating status messages between said forwarding element and said primary control element on a periodic basis, determining whether each status message is received within a predetermined interval, and identifying said failure condition in accordance with said determination.

7. The apparatus of claim 6, wherein said FD module communicates status messages in accordance with a Common Open Policy Service (COPS) Specification.

8. The apparatus of claim 6, wherein said information may comprise data packets and forwarding element state information.

9. The apparatus of claim 6, wherein said information may be synchronized by communicating said information in accordance with a Forwarding And Control Element Separation (ForCES) Protocol.

10. An article comprising:
a storage medium;
said storage medium including stored instructions that, when executed by a processor, result in providing fault tolerance by identifying a first control element as a primary control element, identifying a second control element as a secondary control element, synchronizing information between said primary and secondary control elements, wherein the stored instructions, when executed by a processor, further result in said synchronizing by receiving said information from a forwarding element at both said primary and secondary control elements, detecting a failure condition in said primary control element, and identifying said secondary element as said primary control element in case of said failure condition;
wherein said information comprises data packets and forwarding element state information; and
wherein the stored instructions, when executed by the processor, further result said detecting by communicating status messages between said forwarding element and said primary control element on a periodic basis, determining whether each status message is received within a predetermined interval, and identifying said failure condition in accordance with said determination.

11. The article of claim 10, wherein the stored instructions, when executed by a processor, further result in receiving control information from said primary and secondary control elements at said forwarding element, and discarding said control information from said secondary control element.

12. The article of claim 10, wherein the stored instructions, when executed by a processor, further result in receiving control information from said secondary control element at a blocking agent, and discarding said control information from said secondary control element.

13. A system, comprising:
a computing platform to provide fault tolerance;
said platform being further adapted to identify a first control element as a primary control element, identify a second control element as a secondary control element, synchronize information between said primary and secondary control elements, detect a failure condition in said primary control element, and identify said secondary element as said primary control element in case of said failure condition, wherein said platform is further adapted to perform said synchronizing by receiving said information from a forwarding element at both said primary and secondary control elements, said information comprising data packets and forwarding element state information;
wherein said platform is further adapted to detect said failure condition by communicating status messages between said forwarding element and said primary control element on a periodic basis, determining whether each status message is received within a predetermined interval, and identifying said failure condition in accordance with said determination.

14. The system of claim 13, wherein said platform is further adapted to receive control information from said primary and secondary control elements at said forwarding element, and discard said control information from said secondary control element.

15. The system of claim 13, wherein said platform is further adapted to receive control information from said secondary control element at a blocking agent, and discard said control information from said secondary control element.

* * * * *

UNITED STATES PATENT AND TRADEMARK OFFICE
CERTIFICATE OF CORRECTION

PATENT NO. : 7,197,664 B2
APPLICATION NO. : 10/282457
DATED : March 27, 2007
INVENTOR(S) : Khosravi It is certified that error appears in the above-identified patent and that said Letters Patent is hereby corrected as shown below:

On the Title page, in field (57), under "Abstract", in column 2, line 2, delete "second" and insert -- secondary --, therefor.

In column 9, line 18, in Claim 6, after "and" delete ".".

Signed and Sealed this

Twenty-sixth Day of June, 2007

JON W. DUDAS
*Director of the United States Patent and Trademark Office*